Nov. 23, 1965   S. O. WERNHEIM   3,218,996
REFUSE INCINERATOR
Filed Jan. 21, 1963   2 Sheets-Sheet 1
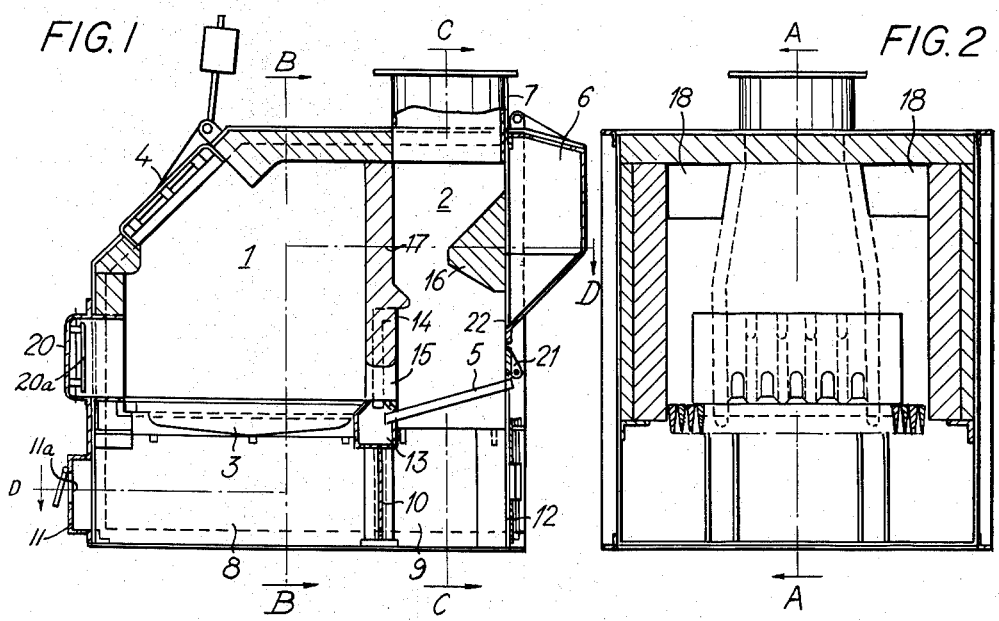
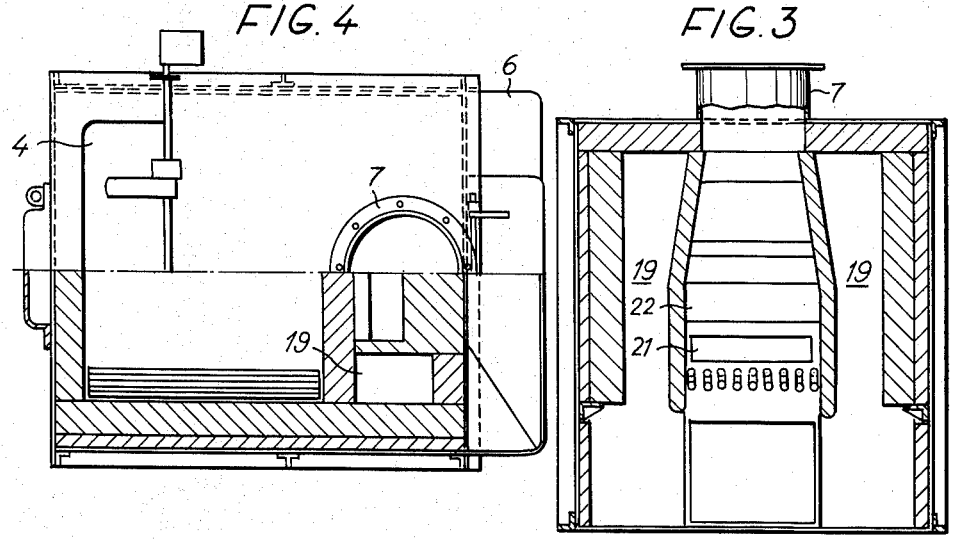

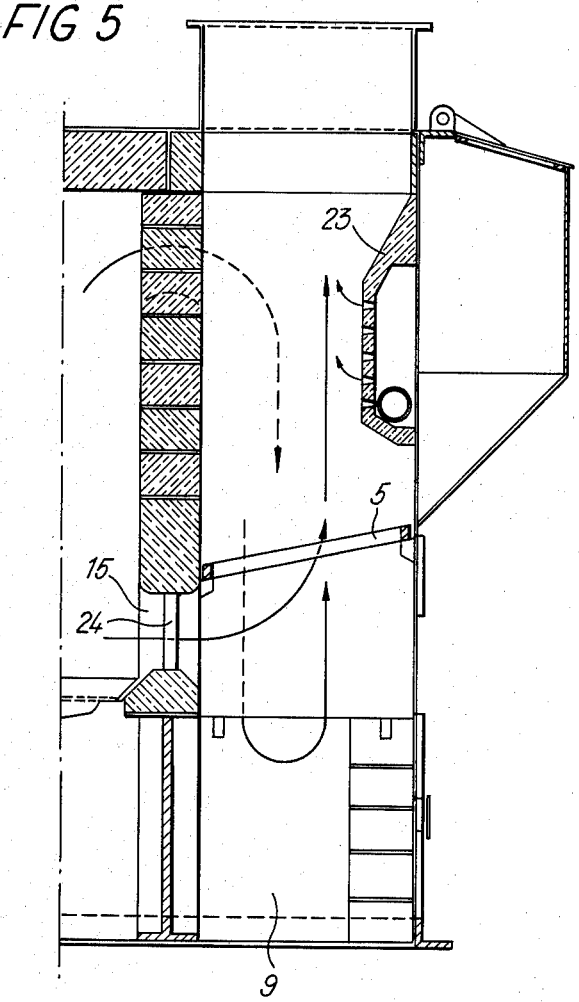

3,218,996
REFUSE INCINERATOR
Sven Oskar Wernheim, Lidingo, Sweden, assignor to
Firma Licentia Ekman & Brundin, Stockholm, Sweden,
a corporation of Sweden
Filed Jan. 21, 1963, Ser. No. 252,861
Claims priority, application Sweden, Jan. 30, 1962,
1,022/62
2 Claims. (Cl. 110—8)

This invention relates to an incinerator for combustion of garbage and other refuse, comprising a refuse shaft and a shaft for high grade solid fuel, said shafts having separate ash pits and being provided with grates and communicating with each other via a through opening disposed in the lower part of the refuse shaft and wherein the top end of the fuel shaft is directly connected to a flue whereas the upper part of the refuse shaft through one or more ducts communicates with the ash pit below the fuel shaft for passing thereto gases and vapours rising from the refuse bed such that said gases and vapours are compelled to pass through the fuel bed.

The object of the invention is to provide an incinerator of the kind referred to which ensures complete and smokeless refuse-combustion.

In its broadest aspect the invention is characterized in that at least the refuse shaft is lined with a refractory heat-insulating material, that the grate of the fuel shaft is located in such relation to the through opening as to compel even gases and vapours flowing out of the refuse shaft through said opening to pass through the fuel bed, and that an intake for secondary combustion air is provided in the fuel shaft at some distance above the grate.

Due to the refractory lining which may consist of bricks the temperature prevailing in the refuse shaft during operation will be kept at such a high value as to prevent condensation of gases and vapours. Preferably, the intake for secondary combustion air is disposed at or near a restricted part of the fuel shaft resulting in whirling movement and increased velocity of the gases which consequently will be intimately mixed with the secondary combustion air and completely and smokelessly burnt.

The invention is described hereinbelow more closely with reference to two embodiments thereof illustrated in the annexed drawing. FIG. 1 is a longitudinal sectional view of a refuse incinerator devised in accordance with the invention, FIG. 2 a sectional view along the line B—B in FIG. 1 and FIG. 3 a sectional view along the line C—C in FIG. 1. The upper part of FIG. 4 is a top view of the incinerator according to FIG. 1, and the lower part of FIG. 4 is a sectional view along the line D—D in FIG. 1. FIG. 5 illustrates a modified embodiment of part of the incinerator according to FIG. 1.

Referring to FIGS. 1 to 4 the refuse incinerator comprises a refuse shaft 1 and a fuel shaft 2. The refuse shaft 1 has a grate 3 and a filling cover 4. The fuel shaft 2 has a grate 5 and a magazine 6 for solid fuel, preferably coal or coke. The fuel shaft is directly connected to a flue 7.

The ash pits 8 and 9 below the grates 3 and 5 respectively, are separated from each other by a wall 10. The ash pit 8 is accessible through a door 11 having a controllable opening $a$ for the supply of primary combustion air. Similarly, the ash pit 9 is provided with a door 12 having a controllable opening for primary combustion air.

The grate 5 is composed of tubes which at one end are open to atmosphere and at the other end terminate in a common air container 13 communicating with upwardly extending tubes which terminate at some distance above the grate in the fuel shaft 2 and constitute an intake 14 for secondary combustion air. The last named tubes extend through an opening 15 through which the two shafts communicate with each other and which is disposed immediately above the grate 3. By means of said tubes the through opening 15 is subdivided into a plurality of smaller apertures.

Projecting into the fuel shaft 2 immediately above the intake 14 for secondary combustion air is a wall portion 16 which forms a local restriction of the fuel shaft 2.

As will best be seen from FIG. 2 the upper part of the rear wall 17 of the refuse shaft has two openings 18 which communicate with two vertical ducts 19 disposed each on one side of the fuel shaft 2 and opening at their lower ends into the ash pit 9.

The upper sides of the grates 3 and 5 are accessible through doors 20 and 21, respectively. Numeral 22 denotes the outlet end of the fuel magazine 6. An air inlet 20$a$ for combustion air is provided in door 20.

In operation the refuse shaft may be filled with refuse to a high level, whereas the grate 5 has resting on it a fuel bed the top surface of which is sloping in accordance with the angle of repose of the fuel, the upper edge of the opening 22 confining the thickness of the fuel layer such that the draft will always be satisfactory and not be reduced by feeding too great an amount of fuel. In steady state the products of combustion of the refuse burning on the grate 3 are flowing through the opening 15 and passing through the flowing fuel bed resting on the grate 5, resulting in a thermal dissociation of at least certain constituents of the gases. As the gases are leaving the fuel bed they will be mixed with secondary combustion air from the intake 14 and will be accelerated and whirled at the restricted part of the fuel shaft 2 formed by the wall portion 16. Consequently, the gases will be intimately mixed with secondary combustion air, resulting in a substantially complete and smokeless combustion of the combustible constituents of the gases.

Garbage or other refuse is often comparatively damp for which reason the actual zone of combustion in the refuse shaft 1 is confined to a level relatively close to the grate 3. The refuse located above the zone of combustion is subjected to a gradual heating resulting in evaporation of water and other liquids, if any, and in a certain dry distillation. The vapours and gases produced arise through the refuse layer and pass through the openings 18 and ducts 19 to the ash pit 9 and then pass upwards through the fuel bed on the grate 5 to be mixed with the other gases.

The supply of primary combustion air to the ash pit 9 is adapted such that the pressure in the ash pit is lower than the pressure above the refuse bed in the refuse shaft 1. In certain cases, primary combustion air need not be supplied to the ash pit 9, and combustion of the fuel on the grate 5 will be kept up by the excess air contained in the gases passing through the fuel bed.

FIG. 5 illustrates a modified embodiment of the fuel shaft 2. Here, the grate 5 is located above the through opening 15 and secondary combustion air is supplied through a perforated box 23 which forms the restriction of the fuel shaft. Inserted in the opening 15 are slats 24 which prevent the refuse from falling down into the ash pit 9. The grate 5 is composed of solid grate bars and does not act to preheat the secondary combustion air which may be preheated in any other suitable manner.

In both embodiments the refuse shaft 1 is lined with refractory bricks maintaining a comparatively high temperature in the refuse shaft during operation. As a result drying of the refuse is facilitated and condensation of the vapours on the walls of the shaft is prevented at the same time.

What is claimed is:
1. An incinerator for combustion of garbage and refuse material comprising a first shaft for the refuse ma- terial including a first grate and a first ash-pit, a second shaft for high grade solid fuel including a second grate and a second ash-pit, said first and second shafts being separated by a common intermediate wall and the spaces defined by said first and second ash-pits being separated by a separating wall, said first and second grates having their adjacent ends located at substantially the same level and said second grate being inclined to extend obliquely upward from said intermediate wall, said first and second shafts communicating with each other through an opening in said intermediate wall located adjacent said grates to permit an inclined incandescent fuel bed in said second shaft to meet a refuse material bed in said first shaft through said opening and to permit vapors and gases from such refuse material to pass through said opening and such incandescent fuel bed, at least one duct interconnecting the upper end portion of said first shaft with the space defined by said second ash-pit below said fuel grate, said first shaft having an air inlet for combustion air and said second shaft having an outlet for flue gases.

2. An incinerator as defined in claim 1, in which that wall of the second shaft which is located opposite to said intermediate wall is provided with a supply opening through which solid fuel may be supplied to said second grate, the upper edge of said supply opening being located at such a height in relation to said opening in the intermediate wall as to define the level of such solid fuel on the inclined second grate to a substantially constant height above said second grate.

References Cited by the Examiner
UNITED STATES PATENTS

| | | | |
|---|---|---|---|
| 299,881 | 6/1884 | Topliff et al. | 110—27 X |
| 462,035 | 10/1891 | Davis | 110—8 |
| 680,107 | 8/1901 | Allen | 110—27 |
| 1,683,730 | 9/1928 | Russell | 110—27 |
| 1,982,803 | 12/1934 | Greenwalt | 110—8 |
| 1,995,893 | 3/1935 | McEver. | |

FREDERICK L. MATTESON, Jr., *Primary Examiner.*

JAMES W. WESTHAVER, *Examiner.*